Reissued Feb. 4, 1936 Re. 19,842

UNITED STATES PATENT OFFICE 19,842

UNSULPHONATED DIACYLATED DIAMINES AND PROCESS OF MAKING SAME

Guillaume de Montmollin, Jacob Danuser, Gérald Bonhôte, and Hans Johner, Basel, Switzerland, assignors to Society of Chemical Industry in Basle, Basel, Switzerland No Drawing. Original No. 1,899,856, dated February 28, 1933, Serial No. 564,466, September 22, 1931. Application for reissue May 15, 1935, Serial No. 21,658. In Switzerland September 27, 1930

16 Claims. (Cl. 260—124)

The present invention relates to the manufacture of new unsulphonated diacylated diamines. It comprises the process of making these new diamines, and the new products themselves.

It has been found that new unsulphonated diacylated diamines of the benzene series may be produced by condensing an aliphatic or an aromatic diamine with an unsulphonated hydroxycarboxylic acid of the benzene series which is so substituted that it couples with diazo-compounds in orthoposition to the OH-group. Such acids are those in which the para-position to the OH-group is occupied by a substituent. As such acids there may for examples be named the p-hydroxybenzoic acid, the cresotinic acids $$OH:CH_3:COOH=1:4:2,\ 1:4:3,$$

monoalkylethers of the dihydroxybenzenecarboxylic acids, such as $C_6H_3:OH:OCH_3:COOH=1:4:3$, etc.

The products so obtained correspond to the general formula:—

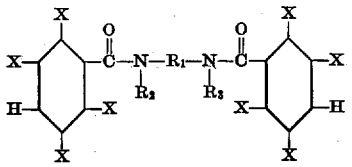

wherein in each benzene nucleus one X stands for OH, the X in para position to the OH stands for alkyl or alkoxy, and the remaining X's stand for hydrogen, $R_2$ and $R_3$ stand for H or alkyl, and $R_1$ means an aromatic radicle.

An example of such a product is the following:—

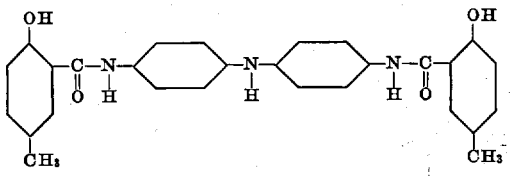

The products so obtained are soluble in caustic alkalies and have a more or less pronounced affinity for vegetable fibers, so that they are absorbed by the fibers and can then be developed by means of various diazo-compounds (among others those referred to in U. S. Patents Nos. 1,034,853, 1,453,660 and 1,457,114) to produce excellent brown dyestuffs. They may also be used as mordants for basic dyestuffs, whereby valuable dyeings are produced.

Various primary and secondary diamines can be used for the condensation. For instance, aliphatic diamines such as ethylene diamines, or aromatic diamines such as ortho-, para-, or meta-phenylene diamines, toluylene diamines, monoalkyl- or symmetrical dialkylphenylene diamines, diaminonaphthalenes, diaminodiphenylmethanes and their analogues and homologues, diaminobenzenes, diaminodiphenylamines, diaminocarbazole, azoxyanilines, azoxytoluidines, diaminoanthraquinones, diaminodiaryls, such as benzidine, tolidine, dianisidine or diphenetidine, diaminodiaryl ureas, diaminodiphenyltriazines, diaminodiarylimidazoles, diaminidiarylimidoxazoles, diaminodiarylimidthiazoles or the like.

The condensation may be conducted in any known manner suitable for making amides.

The following example illustrates the invention:

76 parts by weight of para-cresotinic acid of the formula

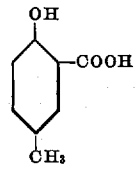

and 64 parts of dianisidine are introduced into 550 parts of toluene, and into the mixture, at about 90° C., there are dropped, in the course of about ½ hour, 34 parts of phosphorus trichloride. The temperature is then raised gradually to 110° C. and maintained thereat for some hours. The mixture is then mixed with an excess of sodium carbonate and toluene is blown off with steam. The residue is filtered, the solid matter washed with water and purified by dissolution in dilute caustic soda solution, filtration and precipitation by addition of acid to the filtrate. When dry the product is a grey white powder. It can be crystallized from chlorobenzene. It forms fine bright scales, melting at 274–276° C. The product corresponds very probably with the formula—

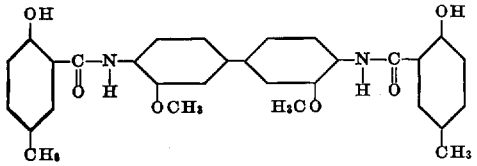

The corresponding product from benzidine of the formula

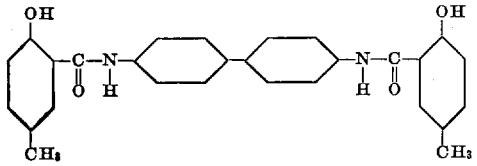

melts with decomposition at 330–333° C., and the o-tolidine derivative of the formula

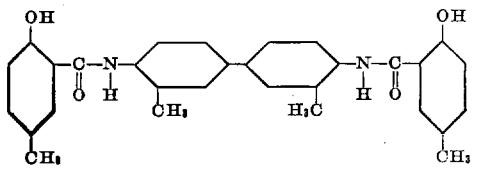

also melts with decomposition at 280–283° C.

In like manner the operation may be conducted with other diamines, such as those named above. Instead of toluene, basic solvents may be used, for instance diethylaniline. In this case the reaction mass may be worked up by introducing it in a dilute acid and then purifying the separated diarylide in known manner, for example, by dissolution in caustic alkali solution and cautious precipitation with acids.

What we claim is:—

1. A process for the manufacture of unsulphonated diacylated diamines of the general formula

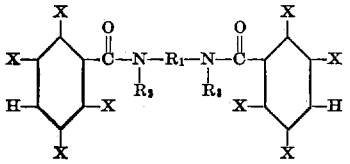

wherein in each benzene nucleus one X stands for OH, the X in para position to the OH stands for alkyl or alkoxy, and the remaining X's stand for hydrogen, $R_2$ and $R_3$ meaning H or alkyl, and $R_1$ meaning an aromatic radical, consisting in causing two molecular proportions hydroxy carboxylic acids of the formula

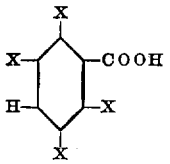

wherein the X's are defined as above, to react in presence of dehydrating agents and in the heat, on one molecular proportion of an aromatic diamine of the general formula

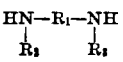

wherein $R_1$, $R_2$ and $R_3$ have the above mentioned significations.

2. A process for the manufacture of unsulphonated diacylated diamines of the general formula

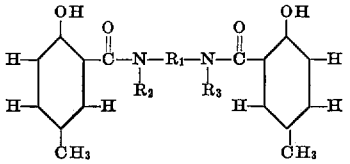

wherein $R_2$ and $R_3$ mean H or alkyl, and $R_1$ means an aromatic radical, consisting in causing two molecular proportions of para-cresotinic acid to react in presence of dehydrating agents and in the heat, on one molecular proportion of an aromatic diamine of the general formula

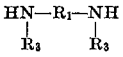

wherein $R_1$, $R_2$ and $R_3$ have the above mentioned significations.

3. Process for the manufacture of unsulphonated diacylated diamines of the general formula

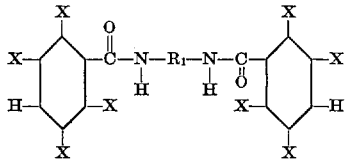

wherein in each benzene nucleus one X stands for OH, the X in para position to the OH stands for alkyl or alkoxy, and the remaining X's stand for hydrogen, $R_1$ standing for a radical of the diphenyl series, consisting in causing two molecular proportions of hydroxycarboxylic acids of the formula

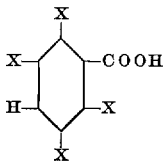

wherein the X's are defined as above, to react in presence of dehydrating agents and in the heat, on one molecular proportion of a diamine of the diphenyl series.

4. Process for the manufacture of unsulphonated diacylated diamines of the general formula

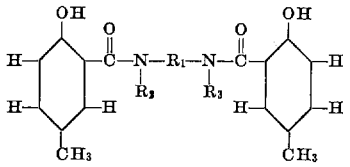

wherein $R_1$ stands for a radical of the diphenyl series, consisting in causing two molecular proportions of para-cresotinic acid to react in presence of dehydrating agents and in the heat, on one molecular proportion of a diamine of the diphenyl series.

5. Process for the manufacture of unsulphonated diacylated diamines of the general formula

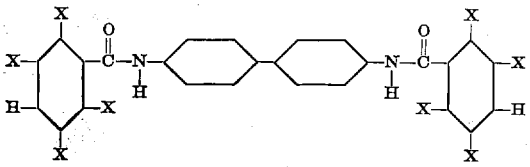

wherein in each benzene nucleus one X stands for OH, the X in para position to the OH stands for alkyl or alkoxy, and the remaining X's stand for hydrogen, consisting in causing two molecular proportions of hydroxycarboxylic acids of the formula

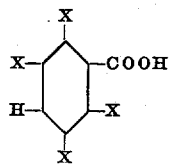

wherein the X's are defined as above, to react, in presence of dehydrating agents and in the heat, on one molecular proportion of benzidine.

6. Process for the manufacture of unsulphonated diacylated diamines of the general formula

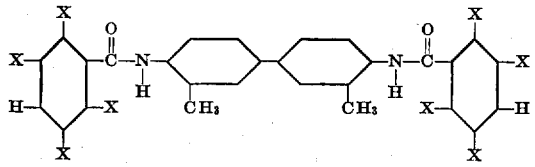

wherein in each benzene nucleus one X stands for OH, the X in para position to the OH stands for alkyl or alkoxy, and the remaining X's stand for hydrogen, consisting in causing two molecular proportions of hydroxycarboxylic acids of the formula

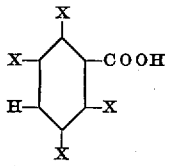

wherein the X's are defined as above, to react, in presence of dehydrating agents and in the heat, on one molecular proportion of orthotolidine.

7. As new products the unsulphonated diacylated diamines of the general formula

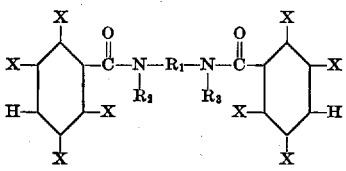

wherein in each benzene nucleus one X stands for OH, the X in para position to the OH stands for alkyl or alkoxy, and the remaining X's stand for hydrogen, $R_2$ and $R_3$ meaning H or alkyl, and $R_1$ meaning an organic radical, which products are soluble in caustic alkalies, have a pronounced affinity for vegetable fibers when in solution in dilute alkalies, react with diazo-compounds with formation of azo-dyestuffs, and are split by saponifying agents into diamines and such hydroxycarboxylic acids of the benzene series in which the para-position to the OH-group is occupied by a substituent.

8. As new products, the unsulphonated diacylated diamines of the general formula

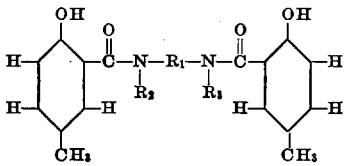

wherein $R_2$ and $R_3$ mean H or alkyl, and $R_1$ stands for an organic radical, which products are soluble in caustic alkalies, have a pronounced affinity for vegetable fibers when in solution in dilute alkalies, react with diazo compounds with formation of azo-dyestuffs, and are split by saponifying agents into diamines and para-cresotinic acid.

9. As new products the unsulphonated diacylated diamines of the general formula

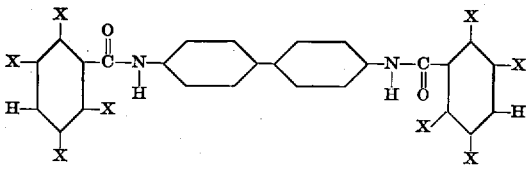

wherein in each benzene nucleus one X stands for OH, the X in para position to the OH stands for alkyl or alkoxy, and the remaining X's stand for hydrogen, which products form bright powders, are soluble in caustic alkalies, have a pronounced affinity for vegetable fibers when in solution in dilute alkalies, react with diazo-compounds with formation of azo-dyestuffs, and are split by saponifying agents into benzidine and such hydroxycarboxylic acids of the benzene series in which the para position to the OH-group is occupied by a substituent.

10. As new products the unsulphonated diacylated diamines of the general formula

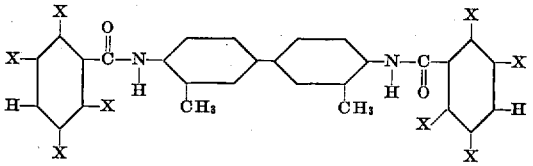

wherein in each benzene nucleus one X stands for OH, the X in para position to the OH stands for alkyl or alkoxy, and the remaining X's stand for hydrogen, which products form bright powders, are soluble in caustic alkalies, have a pronounced affinity for vegetable fibers when in solution in dilute alkalies, react with diazo-compounds with formation of azo-dyestuffs, and are split by saponifying agents into orthotolidine and such hydroxycarboxylic acids of the benzene series in which the para-position to the OH-group is occupied by a substituent.

11. As new products the unsulphonated diacylated diamines of the general formula

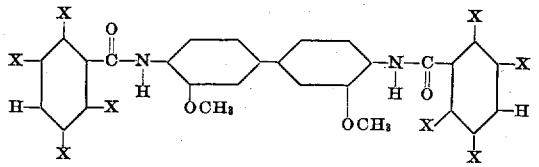

wherein in each benzene nucleus one X stands for OH, the X in para position to the OH stands for alkyl or alkoxy, and the remaining X's stand for hydrogen, which products form bright powders, are soluble in caustic alkalies, have a pronounced affinity for vegetable fibers when in solution in dilute alkalies, react with diazo-compounds with formation of azo-dyestuffs, and are split by saponifying agents into dianisidine and such hydroxycarboxylic acids of the benzene series in which the para-position to the OH-group is occupied by a substituent.

12. Process for the manufacture of an unsulphonated diacylated diamine of the formula

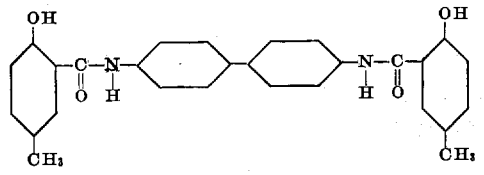

consisting in causing two molecular proportions of para-cresotinic acid to react, in presence of dehydrating agents and in the heat, on one molecular proportion of benzidine.

13. Process for the manufacture of an unsulphonated diacylated diamine of the formula

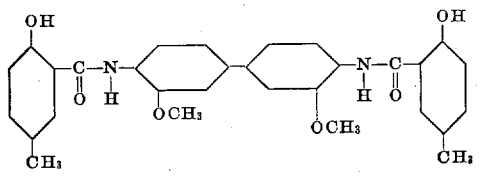

consisting in causing two molecular proportions of para-cresotinic acid to react, in presence of dehydrating agents and in the heat, on one molecular proportion of dianisidine.

14. As a new product the unsulphonated diacylated diamine of the formula

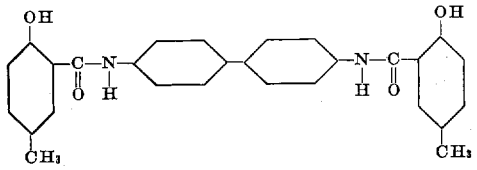

which product is soluble in caustic alkalies, has a pronounced affinity for vegetable fibers when in solution in dilute alkalies, reacts with diazo-compounds with formation of azo-dyestuffs, and is split by saponifying agents into benzidine and para-cresotinic acid.

15. As a new product the unsulphonated diacylated diamine of the formula

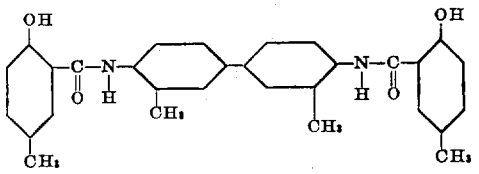

which product is soluble in caustic alkalies, has a pronounced affinity for vegetable fibers when in solution in dilute alkalies, reacts with diazo-compounds with formation of azo-dyestuffs, and is split by saponifying agents into ortho-tolidine and para-cresotinic acid.

16. As a new product the unsulphonated diacylated diamine of the formula

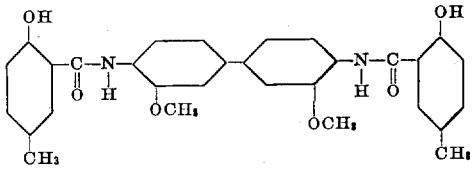

which product is soluble in caustic alkalies, has a pronounced affinity for vegetable fibers when in solution in dilute alkalies, reacts with diazo-compounds with formation of azo-dyestuffs, and is split by saponifying agents into dianisidine and para-cresotinic acid.

GUILLAUME DE MONTMOLLIN.
JACOB DANUSER.
GÉRALD BONHÔTE.
HANS JOHNER.